United States Patent
Merrill et al.

(10) Patent No.: US 8,770,930 B2
(45) Date of Patent: Jul. 8, 2014

(54) JOINING MECHANISM AND METHOD FOR INTERLOCKING MODULAR TURBINE ENGINE COMPONENT WITH A SPLIT RING

(75) Inventors: Gary B. Merrill, Orlando, FL (US); Allister W. James, Chuluota, FL (US); Iain A. Fraser, Ruckersville, VA (US)

(73) Assignees: Siemens Energy, Inc., Orlando, FL (US); Mikro Systems, Inc., Charlottesville, VA (US)

( * ) Notice: Subject to any disclaimer, the term of this patent is extended or adjusted under 35 U.S.C. 154(b) by 654 days.

(21) Appl. No.: 13/023,721

(22) Filed: Feb. 9, 2011

(65) Prior Publication Data
US 2012/0201685 A1    Aug. 9, 2012

(51) Int. Cl.
*F01D 9/00*    (2006.01)

(52) U.S. Cl.
USPC .......................................... 415/190; 29/889.21

(58) Field of Classification Search
USPC ................ 415/189, 190, 208.1, 209.2–209.4, 415/210.1; 416/214 R
See application file for complete search history.

(56) References Cited

U.S. PATENT DOCUMENTS

| | | | |
|---|---|---|---|
| 2,311,434 A * | 2/1943 | Dusevoir | 384/430 |
| 3,059,902 A | 10/1962 | Savonuzzi | |
| 5,226,789 A | 7/1993 | Donges | |
| 5,358,379 A | 10/1994 | Pepperman et al. | |
| 6,062,569 A * | 5/2000 | Strasser et al. | 277/434 |
| 6,086,327 A * | 7/2000 | Mack et al. | 415/160 |
| 6,200,092 B1 | 3/2001 | Koschier | |
| 6,210,106 B1 | 4/2001 | Hawkins | |
| 6,514,046 B1 | 2/2003 | Morrison et al. | |
| 6,648,597 B1 | 11/2003 | Widrig et al. | |
| 6,685,381 B1 * | 2/2004 | Sugita et al. | 403/341 |
| 7,510,369 B2 * | 3/2009 | Lytle | 415/160 |
| 8,256,088 B2 * | 9/2012 | James et al. | 29/447 |
| 2003/0217792 A1 | 11/2003 | James | |
| 2005/0254942 A1 * | 11/2005 | Morrison et al. | 415/200 |
| 2011/0041313 A1 | 2/2011 | James et al. | |

FOREIGN PATENT DOCUMENTS

EP   1754860 A2   2/2007
GB   2234299 A2   1/1991

* cited by examiner

*Primary Examiner* — Nathaniel Wiehe
*Assistant Examiner* — Kayla McCaffrey

(57) ABSTRACT

A modular airfoil assembly (200) and related method for interlocking components of an airfoil structure (210) including a platform (220), an airfoil (210) having a shoulder (230) and a stem (232) extending outward from the shoulder. A ring element (100) positioned against the stem (232) secures the shoulder (230) against the platform (210). First and second members (100a, 100b) of the ring element (100) are bonded together with a portion ($128_j$) of a surface (112a) of the second member (100b) extending within and bonded to a portion ($128_i$) of a surface (112b) of the first member (100a).

12 Claims, 4 Drawing Sheets

JOINING MECHANISM AND METHOD FOR INTERLOCKING MODULAR TURBINE ENGINE COMPONENT WITH A SPLIT RING

FIELD OF THE INVENTION

This invention relates to the field of power generation and, more specifically, to a lock ring device and method of interlocking components of a gas turbine engine.

BACKGROUND OF THE INVENTION

A typical gas turbine engine includes a fan, a compressor, a combustor, and a turbine. Fuel and compressed air discharged from the compressor are mixed and burned in the combustor. The resulting hot combustion gases (e.g., comprising products of combustion and unburned air) are directed through a conduit section from the combustor to the turbine where the gases expand, converting thermal energy into mechanical energy in the form of turbine shaft rotation. In electric power applications, the turbine shaft is coupled to turn a generator. Many parts of the combustor section and turbine section are exposed directly to the hot combustion gasses, including the combustor, the transition duct between the combustor and the turbine section, including the airfoils and surrounding ring segments.

With the efficiency of a gas turbine engine increasing with the firing temperature of the combustion gas, it is desirable to increase the temperature of the combustion gases. Temperature limitations of the materials with which the engine and turbine components are formed limit the operating temperatures. Special superalloy materials have been developed for use in such high temperature environments. However, modern high efficiency combustion turbines have firing temperatures in excess of 1,600 degrees C., which is well in excess of the safe operating temperature of the structural materials used in the hot gas flow path components. Consequently, specific cooling arrangements, including film cooling, backside cooling and insulation coatings are used to protect the integrity of such components under these high temperature conditions. Airfoils are exemplary. The term airfoil as used herein refers to a turbine airfoil which may be a rotor (rotatable) blade or a stator (stationary) vane.

Ceramic and ceramic matrix composite (CMC) materials offer the potential for higher operating temperatures than do metal alloy materials, due to the inherent refractory nature of ceramic materials. This capability may be translated into a reduced cooling requirement that, in turn, may result in higher power, greater efficiency, and/or reduced emissions from the engine. Although CMC's are beginning to find applications in military aircraft engines, they are not commonly utilized in large industrial gas turbines. Ceramics and CMCs do not exhibit the necessary balance of mechanical properties required for the manufacture of entire components. Consequently the use of ceramics has been mainly limited to their application as Thermal Barrier Coatings.

Turbine airfoils normally have associated shrouds or platforms. An airfoil platform defines a flow path between adjacent airfoil members for directing the hot combustion gases past the airfoil. The platform is exposed to the same high temperature gas environment as the ceramic airfoil and thus may be formed of a ceramic material. Currently the majority of blades and vanes are cast as single piece monolithic components. However, to support the introduction of more advanced materials (such as ceramics, CMCs, intermetallics and refractory alloys) modular designs are being considered. In many modular designs the platform and the airfoil are formed as separate components that are mechanically joined together, as illustrated in U.S. Pat. No. 5,226,789. Such mechanical joints must be robust. They tend to be complicated and expensive.

Monolithic ceramic is readily moldable to a form, but it is limited to small shapes and is insufficiently strain-tolerant for robust designs. CMC materials incorporate ceramic fibers in a ceramic matrix for enhanced mechanical strength. However, conventional ceramic composite processing methods increase in complexity and cost in a complex three-dimensional component such as a turbine vane. U.S. Pat. No. 6,200,092 describes a turbine nozzle assembly having a vane forward segment formed of CMC material wherein the reinforcing fibers are specially oriented across the juncture of the airfoil and the platform members. Such special fiber placement in the airfoil-to-platform transition region presents a manufacturing challenge, especially with insulated CMC construction. Furthermore, for some CMC compositions, shrinkage during processing may result in residual stresses in complex shapes that are geometrically constrained. The airfoil-to-platform attachment area is one area where such stresses can arise. Additionally, load transfer between the airfoil and the platform results in interlaminar stresses in the fillet region where mechanical properties may be compromised.

In one solution to these problems, U.S. Pat. No. 6,648,597 discloses a method of manufacture for a vane component of a gas turbine where both the airfoil member and the platform member are formed of a ceramic matrix composite material, and joint surfaces of the airfoil member and the platform member are bonded together. The method may be performed by urging the respective joint surfaces of the airfoil member and the platform member together while both members are in a green body state, followed by forming a sinter bond between them. The sinter bond method may be densified with a matrix infiltration process and the sinter bond may be reinforced with a fastener connected between the respective joint surfaces. The joint surfaces may be bonded with an adhesive. However, ceramic joints using refractory adhesives alone are weak and unreliable for carrying primary loads. Furthermore, when such adhesives are applied to already-fired CMC parts in constrained geometries, the adhesives shrink and produce bond joint cracking.

BRIEF DESCRIPTION OF THE DRAWINGS

The invention is explained in the following description in view of the drawings wherein.

Like reference numerals refer to like parts throughout the drawings.

DETAILED DESCRIPTION OF THE INVENTION

Figure 1A:
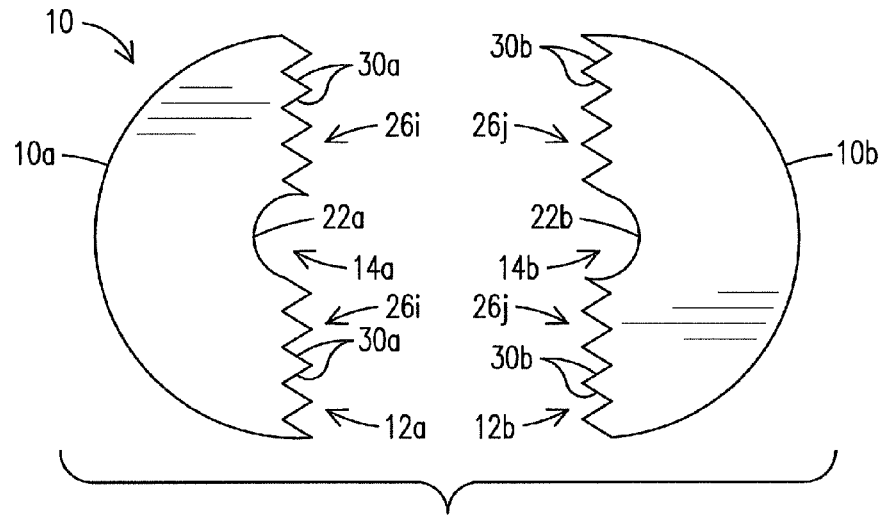
FIG. 1A is a view in cross section of a lock ring device according to the invention prior to assembly.

With reference to FIG. 1A there is shown an exemplary lock ring device 10 according to a simple embodiment of the invention. As shown in the spaced-apart view of FIG. 1A, the device 10 comprises a pair of mating members 10a and 10b. The member 10a has a contact surface, 12a, and the member 10b has a contact surface 12b. The surface 12a is designed for mating contact with the surface 12b. The lock ring members 10a and 10b comprise bonded (with a secondary binder) or partially sintered powder material and are illustrated in FIG. 1A at a stage of assembly wherein they are each unsintered (i.e., green bodies) or partially sintered. They may be formed of any sinterable material.

Figure 1B:
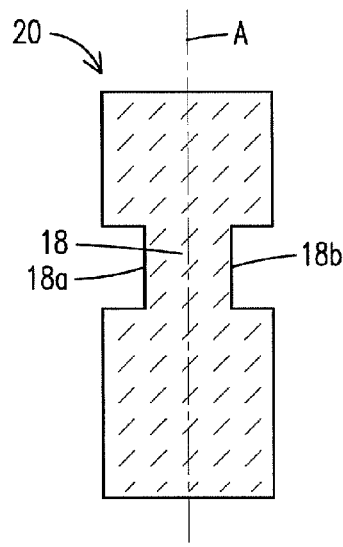
FIG. 1B is a view in cross section of a shaft about which the device of FIG. 1A can be assembled.

The members 10a and 10b each include a cutout 14a, 14b shaped and sized to provide close tolerance contact between a portion of each surface 12a, 12b and a surface along a recessed region 18 in a shaft 20. FIG. 1B illustrates an exemplary shaft 20 in a cross sectional view taken along a central axis A. The surface 12a includes a surface portion 22a positionable against a complementary surface portion 18a along one side of the recessed region 18, and the surface 12b includes a surface portion 22b positionable against a complementary surface portion 18b along another side of the recessed region 18. The surface 12a of the member 10a also includes a pair of mating surface portions $26_i$ and the surface 12b of the member 10b also includes a pair of mating surface portions $26_j$. In this example, the mating surface portions $26_i$, $26_j$ are each in the configuration of a series of saw teeth such that individual surfaces 30a, 30b of saw tooth shapes along different ones of the surface portions $26_i$, $26_j$ can be fit against individual surfaces of saw tooth shapes of the other surface portion to configure the assembled lock ring device 10.

Figure 1C:
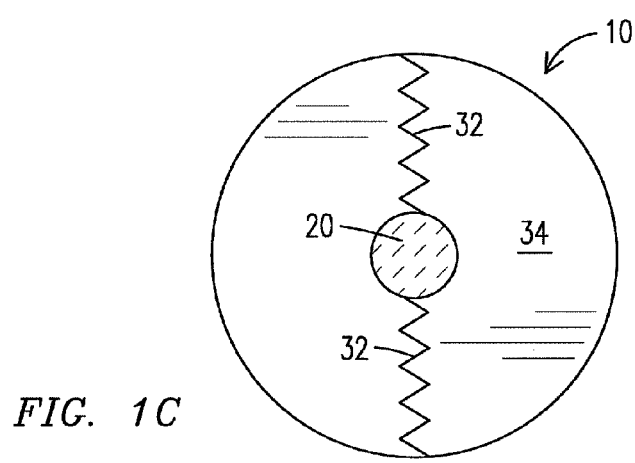
FIG. 1C is a view of the device of FIG. 1A in an assembled configuration.
Figure 1D:
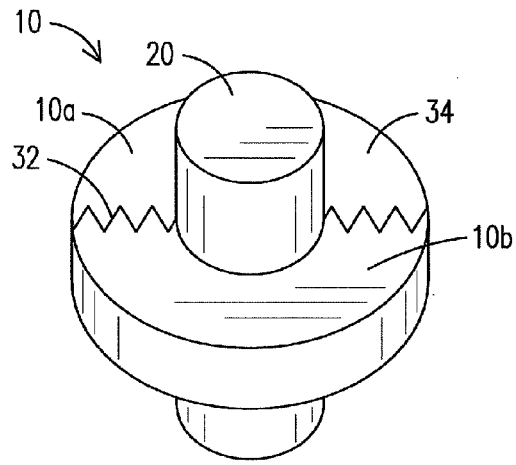
FIG. 1D is a perspective view of the assembled device of FIG. 1C mounted on a shaft.

When the members 10a and 10b are brought together about the recessed region 18 of the shaft 20, the cutouts 14a, 14b each fit about part of the recessed region 18 in accord with the shape of the recessed region, e.g., a cylindrical shape, and with the saw teeth mating surfaces 30a and 30b contacting one another in an interdigitated arrangement 32 as shown in the view along an upper surface 34 of the device 10 shown in FIG. 1C. See, also, the perspective view of the device 10 mounted on the shaft 20 shown in FIG. 10. The term interdigitated, as used herein, refers to an arrangement wherein protrusions are nested between one another, and does not require an interlocking arrangement of the protrusions. That is, a feature of embodiments of lock ring devices according to the invention is that protrusions can bond directly to one another, such as along the tooth shaped surface portions $26_i$, $26_j$, without requiring an overlapping configuration, clamps or fasteners to constrain movement about the protrusions.

With the illustrated arrangement, after positioning the shaft 20 through a hole in a plate, such as the platform of an airfoil, the members 10a, 10b of the lock ring device 10 are fully sintered to bond the mating surface portions $26_i$, $26_j$ to one another.

Figure 2C:
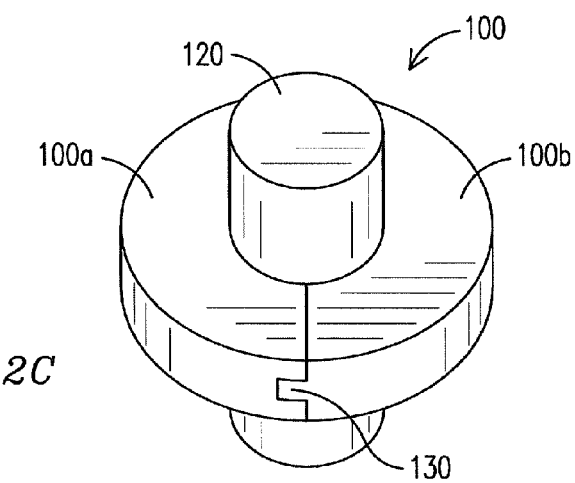
FIG. 2C is perspective view of the lock ring device of FIG. 1A shown in an assembled configuration.
Figure 2A:
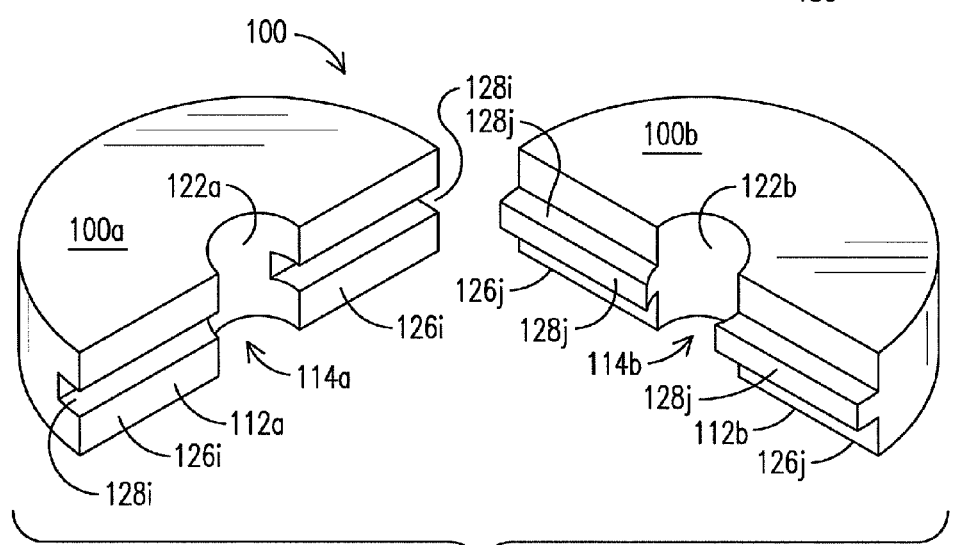
FIG. 2A is a perspective view of a lock ring device according to an alternate embodiment of the invention.
Figure 2B:
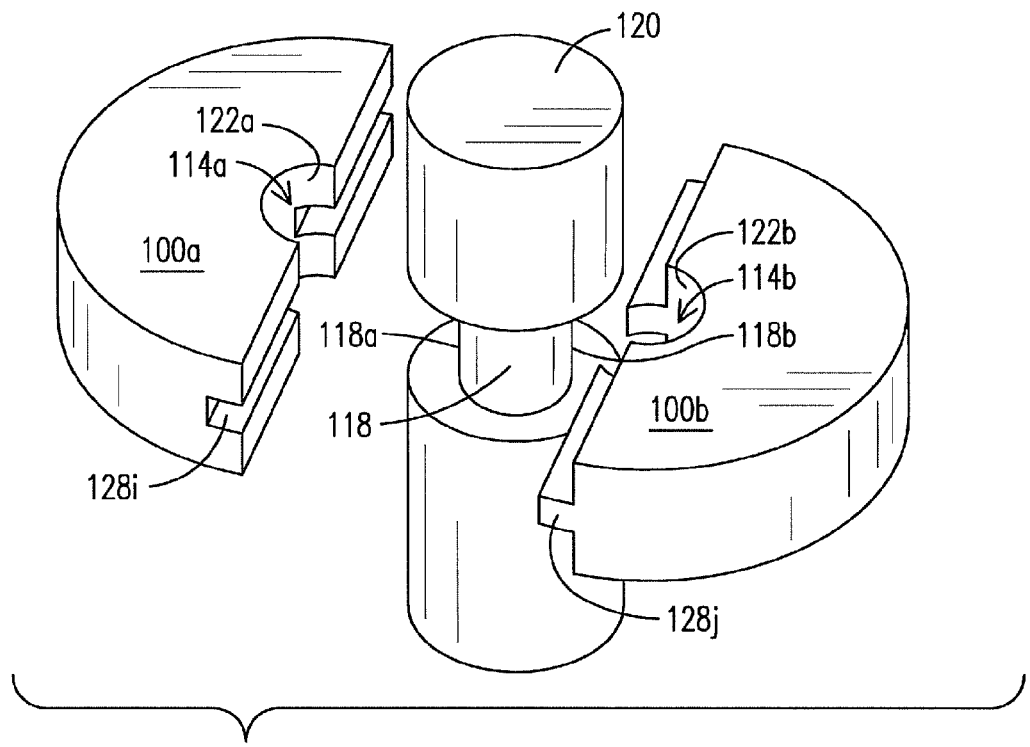
FIG. 2B is perspective view of the lock ring device of FIG. 2A shown in relation to a shaft.

FIG. 2 illustrate another embodiment of the invention in which a lock ring device 100, shown in the spaced-apart perspective view of FIG. 2A, comprises a pair of mating members 100a and 100b each having a major surface, 112a, 112b, for mating contact with the other surface. The lock ring members 100a and 100b are unsintered (i.e., green body) or partially sintered material. As indicated for the embodiment of FIG. 1, they may be formed of any sinterable material. With reference also to FIG. 2B, the surfaces 112a and 112b each include a cutout 114a, 114b shaped and sized to provide close tolerance contact between a portion of each surface 112a, 112b and the surface of a recessed portion 118 of a shaft 120. In FIG. 2B the members 100a and 100b are shown in spaced-apart relation about the recessed portion 118.

The cut-out 114a includes a surface portion 122a along the surface 112a which is positionable against a complementary surface portion 118a of the recess 118, and the cut-out 114b includes a surface portion 122b along the surface 112b which is positionable against a complementary surface portion 118b of the recess 118. The surface 112a of the member 100a also includes two spaced-apart surface portions $126_i$ each extending in a different direction from the cut-out surface portion 122a to effect a mating tongue and groove engagement with one of two spaced-apart surface portions $126_j$ along the surface 112b, i.e., each extending in a different direction from the cut-out surface portion 122b. The surface portions $126_i$ each include a groove $128_i$ formed therein while the surface portions $126_j$ each include a tongue $128_j$ extending outward therefrom which can be received into the groove $128_i$.

When the members 100a and 100b are brought together about the shaft 120, the cutouts 114a, 114b each fit about part of the recess 118 in accord with the shape of the recess, e.g., a circular shape, and the tongues $128_j$ are received into the grooves $128_i$ along the mating surface portions $126_i$, $126_j$, this resulting in a tongue and groove arrangement 130 as shown in FIG. 2C. With this arrangement, and with the shaft 120 positioned through a hole in a plate, the members 110a, 110b of the lock ring device are fully sintered to bond the mating surface portions $126_i$, $128_j$ to one another. In the sintering process each of the tongues $128_j$ of the member 100b becomes bonded within one of the grooves $128_i$ of the member 100a.

Figure 3A:
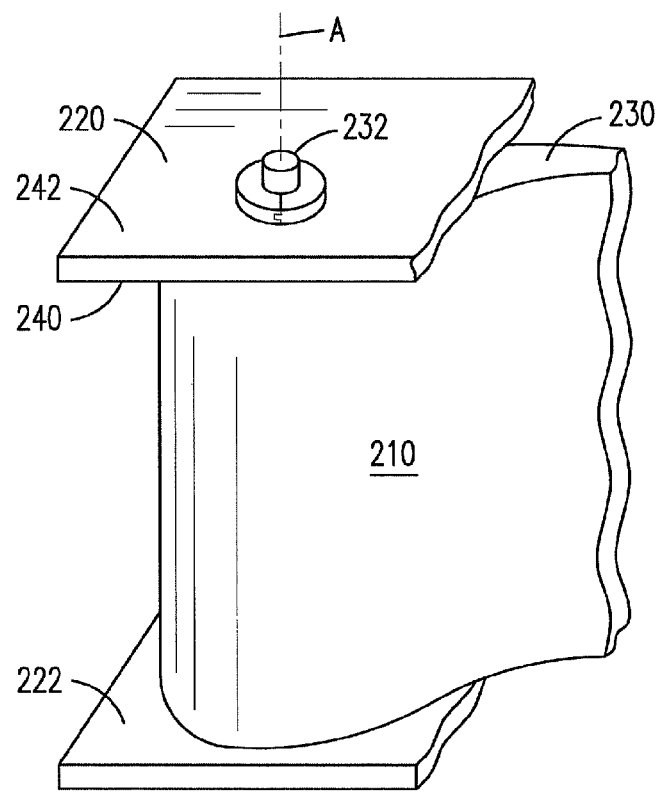
FIG. 3A is a perspective view of a turbine blade incorporating the device of FIG. 2.

FIG. 3 illustrate the lock ring device 100 of FIG. 2, providing attachment of components in a turbine vane 200. As shown in the partial perspective view of the turbine vane in FIG. 3A, vane includes an airfoil portion 210 and upper and lower platform members 220, 222. The airfoil portion 210 includes a shoulder region 230 and a stem 232 extending outward from the shoulder region along an axis A. The stem 232 corresponds to the shaft 120 of FIG. 2. The platform member 220 has first and second sides 240, 242 with a hole 244 extending therethrough. The first side 240 corresponds to a side of the platform member which faces the airfoil, while the second side corresponds to a side of the platform member which faces away from the airfoil.

Figure 3B:
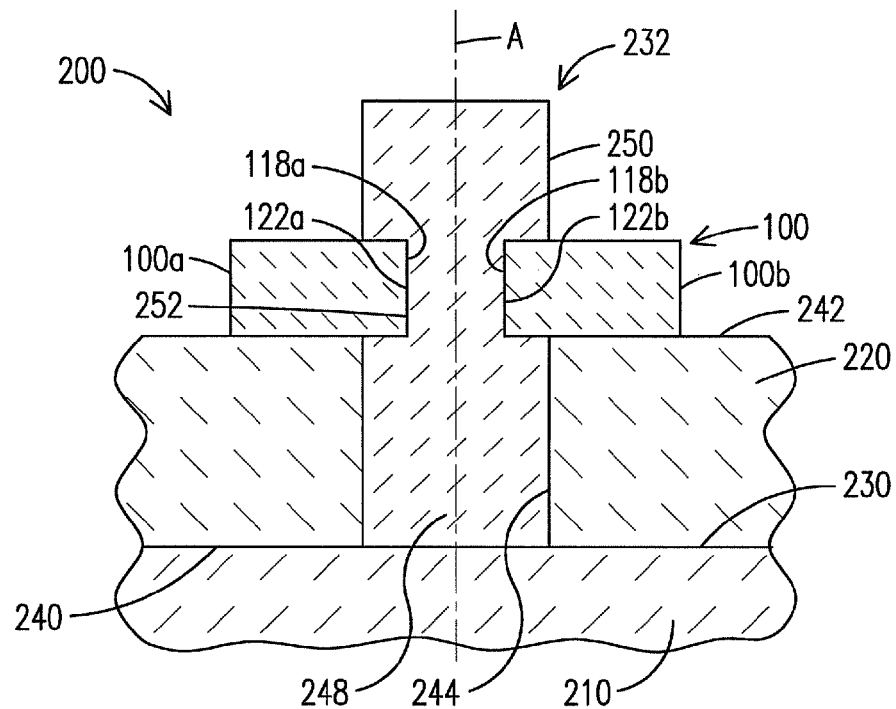
FIG. 3B is a view in cross section of a portion of the turbine blade shown in FIG. 3A.

FIG. 3B is a partial view of a portion of the blade 200 in cross section taken through the axis A, illustrating the stem 232 extending through the hole 244 of the platform member 220, with the shoulder region 230 positioned against the first side 240 of the platform member 220. A proximal portion 248 of the stem 232 adjoins the shoulder region 230, and extends from within the hole 244 away from the shoulder region 230. A distal end region 250 of the stem 232, beyond the proximal portion, extends farther away from the shoulder region. The distal end region 250 includes a recessed portion 252 which in the illustrated example has a cylindrical shape, although the recessed portion may be of other shapes.

Figure 3C:
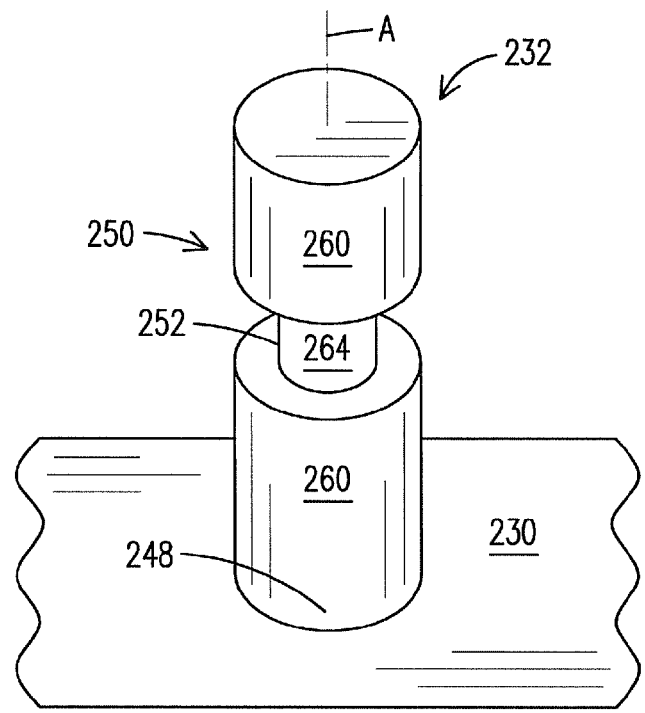
FIG. 3C is a perspective view of a stem associated with an airfoil of the turbine blade of FIG. 3A.

With reference also to a perspective view of the stem 232 shown in FIG. 3C, the proximal portion 248 and portions of the distal end region 250 include first peripheral surface regions 260. The recessed portion 252 of the stem 232 includes a second peripheral surface region 264 positioned inward toward a central axis A of the stem, relative to the first peripheral surface regions 260. The lock ring device 100 is illustrated in FIG. 3B as a ring element positioned against the recessed portion 252 of the stem 232, extending outward from the second peripheral surface region 264, in a radial direction with respect to the axis A, beyond the first peripheral surface 260, to provide a locking mechanism by which the shoulder region 230 is fixedly secured against the first side 240 of the platform member. As described with respect to FIG. 2, the locking ring device 100 comprises first and second members 100a, 100b, joined together along mating surfaces 112a, 112b. The surface 112a of the first member 100a has two spaced-apart mating surfaces regions $126_i$ along which the grooves $128_i$ are formed and the surface 112b of the second member 100b has two spaced-apart mating surface regions $126_j$ along which the tongues $128_j$ are formed.

While various embodiments of the present invention have been shown and described herein, it will be obvious that such embodiments are provided by way of example only. For example, the illustrated embodiments describe bonding of mating surfaces without an intervening bonding layer but use of a bonding layer is contemplated for other embodiments.

Generally according to one series of embodiments there has been disclosed an airfoil assembly having a platform member, an airfoil portion and a ring element. The platform member has first and second sides and a hole having a first radial dimension extending therethrough. The airfoil portion has a shoulder region and a stem extending outward from the shoulder region along an axis. The shoulder region is positioned along the first side of the platform member. The stem has a proximal portion adjoining the shoulder region and extending into the hole, and a distal end region extending away from the shoulder region and away from the proximal portion. The ring element is positioned against and extends outward from the stem in a radial direction with respect to the axis. The shoulder region is secured against the first side of the platform member. The ring element has first and second members bonded together. The first member has first and second mating surfaces and the second member has third and fourth mating surfaces. A portion of the third mating surface of the second member extends within and is bonded to a portion of the first mating surface of the first member, and a portion of the fourth mating surface of the second member extends within and is bonded to a portion of the second mating surface of the first member. A feature of the disclosed embodiments is that when the ring element is positioned in a recess along the stem, movement of the ring element along the axis is limited or completely prevented. Other arrangements are contemplated, including formation of one or more stops along the surface of the stem to prevent movement of the ring element along the axis of the stem.

Numerous variations, changes and substitutions may be made without departing from the invention herein. Accordingly, it is intended that the invention be limited only by the spirit and scope of the appended claims.

The claimed invention is:

1. A modular airfoil assembly comprising:
a platform member having first and second sides and a hole extending therethrough;
an airfoil portion having a shoulder region and a stem extending outward from the shoulder region along an axis and through the hole of the platform member, with the shoulder region abutting the first side of the platform member, the stem having a proximal portion extending away from and adjoining the shoulder region, and a distal end region extending away from the shoulder region and beyond the proximal portion, the proximal portion positioned in the hole and the distal end region including a recessed portion extending between mutually opposed surfaces disposed perpendicular to the axis along which the stem extends,
the proximal portion including a first peripheral surface region along which the proximal portion extends from the hole, the recessed portion including a second peripheral surface region positioned inward toward the axis relative to the first peripheral surface region;
a ring element positioned in and extending outward from the second peripheral surface, in a radial direction from the axis, beyond the first peripheral surface, to provide a locking mechanism by which the shoulder region is secured against the first side of the platform member, the ring element comprising first and second members joined together, the first member comprising first and second mating surfaces and the second member comprising third and fourth mating surfaces, wherein the ring element is positioned against the stem in the recessed portion so that movement of the ring element along the axis is limited or prevented by the mutually opposed surfaces disposed perpendicular to the axis,
a portion of the third mating surface of the second member extending within and bonded to a portion of the first mating surface of the first member, and
a portion of the fourth mating surface of the second member extending between and bonded to a portion of the second mating surface of the first member,
wherein the first and second members of the ring element comprise a sinterable material sintered to bond to one another at corresponding mating surfaces of the first and second members of the ring element.

2. The assembly of claim 1 wherein portions of the first mating surface of the first member extend between and are bonded to portions of the third mating surface of the second member.

3. The assembly of claim 1 wherein portions of the first mating surface of the first member extend between and are bonded to portions of the third mating surface of the second member, and portions of the second mating surface of the first member extend between and are bonded to portions of the fourth mating surface of the second member.

4. The assembly of claim 1 wherein said portions of the first mating surface are bonded to portions of the third mating surface without an intervening bonding layer, and said portions of the second mating surface are bonded to portions of the fourth mating surface without an intervening bonding layer.

5. The assembly of claim 1 wherein the first and second members of the ring element are sintered into a unified structure along the mating surfaces.

6. A modular airfoil assembly comprising:
a platform member having first and second sides and a hole extending therethrough;
an airfoil portion having a shoulder region and a stem extending outward from the shoulder region along an axis with the shoulder region along the first side of the platform member,
the stem having a proximal portion adjoining the shoulder region and extending into the hole, and a distal end region extending away from the shoulder region and away from the proximal portion, wherein the distal end region of the stem includes a recessed portion extending between mutually opposed surfaces disposed perpendicular to the axis along which the stem extends,
a ring element positioned against and extending outward from the stem, in a radial direction with respect to the axis, with which the shoulder region is secured against the first side of the platform member, the ring element comprising first and second members bonded together, the first member comprising first and second mating surfaces and the second member comprising third and fourth mating surfaces, wherein the ring element is positioned against the stem in the recessed portion so that movement of the ring element along the axis is limited or prevented by the mutually opposed surfaces disposed perpendicular to the axis;

a portion of the third mating surface of the second member extending within and bonded to a portion of the first mating surface of the first member, and a portion of the fourth mating surface of the second member extending within and bonded to a portion of the second mating surface of the first member, wherein the first and second members of the ring element comprise a sinterable material sintered to bond to one another at corresponding mating surfaces of the first and second members of the ring element.

7. The assembly of claim 6 wherein:

a plurality of portions of the third mating surface of the second member extend within and are bonded to a plurality of portions of the first mating surface of the first member, and a plurality of portions of the fourth mating surface of the second member extend within and are bonded to a plurality of portions of the second mating surface of the first member.

8. The assembly of claim 6 wherein the first mating surface is bonded to the third mating surface without an intervening bonding layer.

9. The assembly of claim 6 wherein the first mating surface is bonded to the third mating surface without an intervening bonding layer, and a portion of the second mating surface is bonded to a portion of the fourth mating surface without an intervening bonding layer.

10. A method for interlocking components of an airfoil structure, comprising:

providing a platform member having first and second sides and a hole extending from a first opening in the first side to a second opening in the second side;

providing an airfoil portion having a shoulder region and a stem extending outward from the shoulder region along an axis, providing a ring element comprising first and second members, each member having a pair of spaced apart contact surfaces for bonding with a surface of the other member;

positioning a first portion of the stem in the hole of the platform member, with the shoulder region adjoining the first side of the platform member and with a second portion of the stem extending away from the shoulder, and beyond the first portion of the stem relative to the second opening;

positioning the first and second members of the ring element about the second portion of the stem so they each extend outward in a radial direction with respect to the axis, with the first and second ring element members joined together along the contact surfaces, wherein the second portion of the stem includes a recess extending between mutually opposed surfaces disposed perpendicular to the axis along which the stem extends, and wherein the positioning of the first and second members of the ring element includes placing the members of the ring element in the recess, wherein movement of the ring element along the axis is limited or prevented by the mutually opposed surfaces disposed perpendicular to the axis; and sintering the ring element members together by bonding the contact surfaces of each to contact surfaces of the other thereby providing a locking mechanism by which the shoulder region is secured against the first side of the platform member.

11. The method of claim 10 wherein bonding the contact surfaces of each to contact surfaces of the other is performed without an intervening bonding layer.

12. The method of claim 10 wherein the step of providing the ring element comprising first and second members comprises forming the ring members of a ceramic matrix composite material.

* * * * *